US012368637B2

(12) United States Patent
Sejko et al.

(10) Patent No.: US 12,368,637 B2
(45) Date of Patent: Jul. 22, 2025

(54) COORDINATED MIGRATION OF A NETWORK TO A COMMUNICATION PROTOCOL

(71) Applicant: Cisco Technology, Inc., San Jose, CA (US)

(72) Inventors: Uljana Sejko, Wood Dale, IL (US); Pooja Vishvanath Indi, San Jose, CA (US); Vandhana Somaskanthan, Milpitas, CA (US); Santosh Ramrao Patil, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/143,581

(22) Filed: May 4, 2023

(65) Prior Publication Data

US 2024/0372775 A1    Nov. 7, 2024

(51) Int. Cl.
*H04L 41/0803*    (2022.01)

(52) U.S. Cl.
CPC ................. *H04L 41/0803* (2013.01)

(58) Field of Classification Search
CPC ......... H04L 2101/659; H04L 2101/686; H04L 61/2542; H04L 41/0897; H04L 67/34; H04L 67/148; H04L 69/167
See application file for complete search history.

(56) References Cited

U.S. PATENT DOCUMENTS

| 2013/0329750 | A1 | 12/2013 | Asati et al. |
| 2019/0238415 | A1* | 8/2019 | Krishnamurthy ..... G06F 16/285 |
| 2020/0177641 | A1* | 6/2020 | Wikoff ................ H04L 65/1033 |

FOREIGN PATENT DOCUMENTS

| CN | 102710802 | A | * | 10/2012 | |
| CN | 104135446 | A | | 11/2014 | |
| CN | 106656720 | A | | 5/2017 | |
| CN | 112422330 | A | * | 2/2021 | ........... H04L 41/082 |
| CN | 114301994 | A | * | 4/2022 | |

OTHER PUBLICATIONS

FCC, "FCC Information Technology (IT) IPv6 Implementation Plan", Dec. 2022 (Year: 2022).*
RFC7381, "Enterprise IPv6 Deployment Guidelines", Oct. 2014 (Year: 2014).*

(Continued)

*Primary Examiner* — Messeret F Gebre
(74) *Attorney, Agent, or Firm* — Lee & Hayes, P.C.

(57) ABSTRACT

This disclosure describes techniques for migrating nodes from a first communication protocol to a second communication protocol. An example method is performed by a software-defined wide area network (SDWAN) controller. The example method includes identifying nodes in a network; identifying features associated with the nodes; identifying Internet Protocol version 6 (IPv6)-incompatible features among the features; and outputting, to a user, a list of the IPv6-incompatible features. The example method further includes receiving, from the user, a selection of nonessential features including at least one of the IPv6-incompatible features; identifying at least one of the nodes corresponding to the selection; and causing migration of the at least one of the nodes to IPv6.

20 Claims, 8 Drawing Sheets

(56) References Cited

OTHER PUBLICATIONS

HHS, "HHS Policy For The Transition To Internet Protocol Version 6 (Ipv6)", Aug. 2021. (Year: 2021).*

J. Esch, "Prolog to: "IMS: The New Generation of Internet-Protocol-Based Multimedia Services"," in Proceedings of the IEEE, vol. 101, No. 8, pp. 1856-1859, Aug. 2013 (Year: 2013).*

Eibl, S., & Rüde, U. (2018). A local parallel communication algorithm for polydisperse rigid body dynamics [arXiv]. ArXiv, , 20 pp (Year: 2018).*

A. P. Plageras, K. E. Psannis, G. Kokkonis and Y. Ishibashi, "Efficient Big Data Delivery over IoT Networks," 2021 IEEE 9th International Conference on Information, Communication and Networks (ICICN), Xi'an, China, 2021, pp. 250-253, (Year: 2021).*

Arafat, et al, "On the Migration of a Large Scale Network from IPv4 to IPv6 Environment," International Journal of Computer Networks & Communications (IJCNC), vol. 6, No. 2, Mar. 2014, pp. 111-126.

Bisecco, et al., "Enterprises: How to Deploy IPv6?", IPv6 Transition Guide, Jul. 6, 2022, pp. 1-124.

* cited by examiner

COORDINATED MIGRATION OF A NETWORK TO A COMMUNICATION PROTOCOL

TECHNICAL FIELD

The present disclosure relates generally to controller-mediated migration of a network from a first communication protocol to a second communication protocol, such as migration of a network from IPv4 to IPv6.

BACKGROUND

Internet Protocol (IP) designates a set of communication protocols for transmitting data across a network. Using these protocols, a source host may transmit data packets to a designation host via one or more intermediary network nodes in a networked environment. Each node within the network, including each one of the source host and the destination host, is associated with an IP address that uniquely identifies each node. The data packets transmitted by the source host, for example, include a header that specifies the IP address of the source host and the IP address of the destination host. The intermediary nodes can correctly route the data packets to the destination host based on the information specified in the headers of the data packets. A header of a data packet may further specify a lifespan (referred to as a time to live (TTL) or hop limit) of the data packet, to prevent the data packet from circling indefinitely due to a routing loop or other issue within the network.

Several versions of IP have been adopted over time. IP version 4 (IPv4) was introduced in 1981. In IPv4, each IP address is defined according to 32 bits. However, as the number of devices connected to the Internet has grown over time, the address space of IPv4 has become significantly depleted. The five regional Internet registries (RIRs) responsible for assigning IPv4 addresses to various nodes have all exhausted their allocated IPv4 address pools. While some IPv4 addresses can be recycled, the exhaustion of the IPv4 address space represents a significant problem to the future growth of the Internet and other networks.

IP version 6 (IPv6) is another version of IP that provides a solution to the exhaustion of IPv4 addresses. According to IPv6, individual IP addresses are defined with 128 bits, rather than 32 bits. Accordingly, the IPv6 address space is much larger than the IPv4 address space. IPv6 is also different from IPv4 in other respects. For example, IPv4 packet headers include a checksum, whereas IPv6 packet headers omit a checksum field. The absence of a checksum in IPv6 packet headers can be advantageous for packet routing. When routing IPv4 packets, the checksum must be recalculated each time a TTL field is reduced by one. In contrast, when routing IPv6 packets, no checksum is recalculated each time a hop limit field is reduced by one.

Despite the advantages of IPv6 over IPv4, adoption of IPv6 has been slow. One challenge to migrating nodes from IPv4 to IPv6 is that a significant amount of software and hardware was designed for IPv4. Accordingly, migration of nodes including or otherwise utilizing IPv4-specific features can cause those nodes to malfunction or stop functioning altogether.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
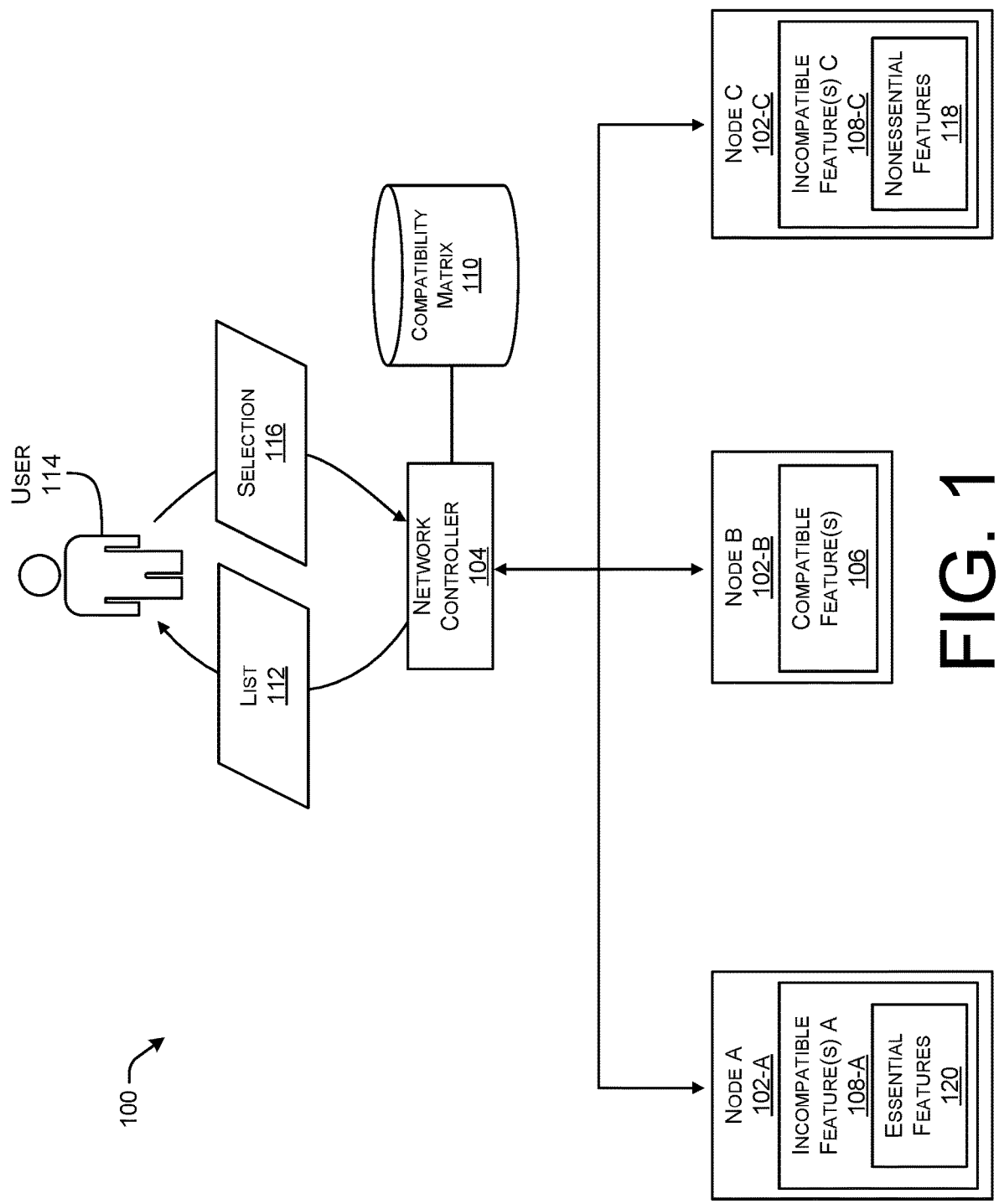
FIG. 1 illustrates an environment for implementing migration of a network from a first communication protocol to a second communication protocol.

This disclosure describes techniques for migrating nodes in a network from a first communication protocol (e.g., IPv4) to a second communication protocol (e.g., IPv6). An example method includes identifying nodes in a network; identifying features associated with the nodes; identifying IPv6-incompatible features among the features; outputting, to a user, a list of the IPv6-incompatible features; receiving, from the user, a selection of nonessential features including at least one of the IPv6-incompatible features; identifying at least one of the nodes corresponding to the selection; and causing migration of the at least one of the nodes to IPv6.

In some examples, the features further include IPv6-compatible features.

According to some cases, the features include software elements or hardware elements installed in the nodes. For example, the software elements include at least one of: a kernel, an operating system, application, firmware, or a program. In some instances, the hardware elements include at least one of: a network interface card, a wireless network interface controller, a wireless network adapter, a microprocessor, a memory device, a chipset, or an input/output device.

In various instances, identifying the IPv6-incompatible features among the features includes: determining, based on a compatibility matrix, the IPv6-incompatible features.

In some implementations, causing the migration of the at least one of the nodes to IPv6 includes: identifying an IPv6 configuration of the at least one of the nodes; and transmitting, to the at least one of the nodes, a migration message indicating the IPv6 configuration. The IPv6 configuration, for instance, includes an IPv6 address, an IPv6 routing table, an IPv6 neighbor discovery protocol configuration, an IPv6 maximum transmission unit (MTU) path discovery configuration, an IPv6 Internet control message protocol (ICMPv6) configuration, or a ternary content-addressable memory (TCAM) space configuration.

According to some cases, the selection is a first selection, the at least one of the nodes includes a first subset of the nodes, and the example method further includes receiving, from the user, a second selection of essential features among the IPv6-incompatible features; identifying a second subset of the nodes corresponding to the essential features; and refraining from migrating the second subset of the nodes to IPv6.

In various implementations, the example method can be implemented by one or more computing devices. For example, the example method can be stored in a non-transitory, computer-readable medium configured to be executed by at least one processor. In some particular cases, the example method is implemented by a software defined wide area network (SDWAN) controller.

Example Embodiments

Various implementations of the present disclosure provide a controller that facilitates IPv4 to IPv6 migration of nodes in a network. In some examples, the controller identifies features (e.g., software and/or hardware) of nodes in the network utilizing IPv4. Using a compatibility matrix, the controller determines which of those features will malfunction if the hosting nodes are migrated to IPv6 (also referred to as "incompatible features"). The controller may report these features to a user, such as a network administrator. The user may determine that some of the features are unimportant or otherwise irrelevant to the network, which can be referred to as "nonessential features." By selecting these features (or alternatively, selecting features that are important and relevant to the network, which are referred to as "essential features") the controller may identify which of the nodes can be migrated to IPv6 without significantly disrupting the network. In some cases, the controller automatically generates configurations for those nodes and causes them to migrate from IPv4 to IPv6 by providing those configurations to the respective nodes. However, the controller may refrain from causing nodes that include any of the essential features to migrate to IPv6. Accordingly, the controller may facilitate selective migration of nodes from IPv4 to IPv6 that will avoid significant problems in the network.

In various implementations, the controller facilitates ongoing migration of nodes from IPv4 to IPv6 as conditions within the network change. In some cases, certain incompatible features may be updated to become IPv6-compatible. The compatibility matrix can be updated over time to reflect these changes. In some cases, certain features that were once essential may become nonessential. The user, for example, can input indications to the controller that indicate when a feature has become nonessential. Further, the nodes themselves may be updated to omit certain incompatible features. The nodes, according to some implementations, may report changes to their respective features to the controller. In response to these changing conditions, the controller may automatically facilitate migration of nodes from IPv4 to IPv6 that are not associated with any incompatible and essential features to the network.

FIG. 1 illustrates an environment 100 for implementing migration of a network from a first communication protocol to a second communication protocol. As illustrated, the environment 100 includes nodes A to C 102-A to 102-C. As used herein, the terms "node," "network node," "hosting node," and their equivalents, can refer to any entity within a network that can communicate with at least one other node using a communication protocol. A node may be a device, a software instance, a Virtual Machine (VM), a container, a virtual process, or the like. In some examples, a node may include a grouping of devices or virtual resources, such as security groups, subnetworks, and so forth. In some examples, a node can be an edge device, such as a router, a switch, a wide area network device, a gateway, a multiplexer, or the like. Computing devices are examples of nodes. As used herein, the term "computing device," and its equivalents, can refer to a device that includes one or more processors configured to perform operations. In various cases, a computing device further includes memory configured to store instructions that are executed by the processor(s).

Nodes A to C 102-A to 102-C include computing devices within the network that are utilizing the first communication protocol and could benefit from migration to the second communication protocol. In various implementations, nodes A to C 102-A to 102-C communicate with at least one other node using a first communication protocol. The nodes A to C 102-A to 102-C may be included in the network.

As used herein, the term "communication protocol," and its equivalents can refer to any protocol that enables an entity to transmit information across a communication network. A communication protocol can be an Internet protocol (IP), a transmission control protocol/IP (TCP/IP), a user datagram protocol/IP (UDP/IP), an OSI protocol, a routing protocol, a web service protocol, or the like. A communication system can be a software-defined wide area network (SDWAN), a wide area network (WAN), a wireless wide area network (WWAN), a wireless local area network (WLAN), a local area network (LAN), or any other network that facilitates communications between nodes.

In some examples, the first communication protocol and the second communication protocol are different versions of IP. For example, the first communication protocol may be IPv4 and the second communication protocol may be IPv6. The second communication protocol may provide a benefit over the first communication protocol. A benefit may include improved routing, administration, availability of addresses, performance, or security. In some examples, a benefit may include auto-configuration, built-in authentication, or multicast routing. Accordingly, it may be beneficial to migrate the nodes A to C 102-A to 102-C from the first communication protocol to the second communication protocol.

Despite the advantages of the second communication protocol, however, certain features utilized by the nodes (e.g., nodes A to C 102-A to 102-C) may not function properly or may not function at all when the hosting node(s) are migrated to the second communication protocol. As used herein, the term "feature," and its equivalents can refer to software elements or hardware elements associated with a node. In some examples, the software elements include a kernel, an operating system, application, firmware, a program, or a combination thereof. In some examples, the hardware elements include a network interface card, a wireless network interface controller, a wireless network adapter, a microprocessor, a memory device, a chipset, or an input/output device, or a combination thereof.

In some cases, the network controller 104 identifies which of the nodes A to C 102-A to 102-C can be migrated without causing disruptions in the network. Implementations of the present disclosure address these and other problems by facilitating selective migration of the nodes A to C 102-A to 102-C to the second communication protocol, based on the unique needs of the network.

In various implementations of the present disclosure, a network controller 104 coordinates selective migration of the nodes A to C 102-A to 102-C within the network from the first communication protocol to the second communication protocol. The selective migration facilitated by the network controller 104 may prevent problems within the network resulting from features utilized by the nodes A to C 102-A to 102-C that are caused by incompatibilities with the second communication protocol. As used herein, the terms "network controller," "controller," and their equivalents can refer to any entity that monitors, manages, troubleshoots, or maintains nodes in a network. A network controller can be a SDWAN controller, WAN controller, LAN controller, WLAN controller, or any other entity that manages nodes in a network. In various cases, the network controller 104 is implemented via hardware, software, or a combination thereof. For example, the network controller 104 may be executed on a computing device.

The network controller 104 may be connected to nodes A to C 102-A to 102-C in a network via at least one interface. As used herein, the term "interface," and its equivalents, can refer to a connection between two nodes in a network or between a network controller and a node in a network. In some cases, an interface may directly connect the two nodes and/or may omit any intermediary nodes. An interface may be connected to a first port of a first device and to a second port of a second device. In some cases, an interface between two nodes can be a wired interface, such that a packet can be transmitted as a signal conducted through a solid medium (e.g., an Ethernet cable, a fiber-optic cable, etc.) connecting the two nodes. In some examples, an interface between nodes can be a wireless interface, such that a packet can be transmitted as a signal through a fluid medium (e.g., air, water, etc.) connecting the two nodes. A wireless interface may be defined according to a type of wave used to carry the signal (e.g., a sound wave, an electromagnetic wave, etc.) and a frequency of the wave (e.g., an ultrasonic frequency, a radio frequency, an infrared frequency, etc.). An interface may be further defined according to a particular communication protocol, which may indicate how data transmitted over the interface is modulated. Some examples of communication protocols applicable to this disclosure include TCP/IP, Wi-Fi, Bluetooth, or the like.

Before migration, each one of the nodes A to C 102-A to 102-C may be utilizing the first communication protocol. Both the first communication protocol and the second communication protocol, in various examples, are respectively associated with different address spaces for network nodes. For example, IPv4 is associated with an IPv4 address space including 32-bit addresses for each of the nodes A to C 102-A to 102-C. To migrate the nodes A to C 102-A to 102-C to IPv6, each one of the nodes A to C 102-A to 102-C are assigned 128-bit addresses in the IPv6 address space. In various implementations, the network controller 104 may identify appropriate addresses for nodes A to C 102-A to 102-C within the address space associated with the second communication protocol.

The network controller 104 may collect and store information indicating the features associated with the nodes A to C 102-A to 102-C. In some examples, the network controller 104 may store information about the compatibility of features with the second communication protocol.

Node B 102-B may include compatible features 106. The compatible features 106 are features that function properly on nodes that have been migrated to the second communication protocol. Features are "compatible" with the second communication protocol if they function properly on nodes that have been migrated to the second communication protocol. For example, the compatible features 106 of node B 102-B may function appropriately when node B 102-B is utilizing IPv4, IPv6, or both.

Node A may include incompatible features A 108-A, and node C may include incompatible features C 108-C. The incompatible features A and C 108-A and 108-C are features that function improperly, or do not function at all, on nodes that have been migrated to the second communication protocol. Examples of the incompatible features A and C 108-A and 108-C may include an address format, a packet header, or another software or hardware element that functions improperly on nodes using the second communication protocol. In some cases, migrating nodes A and C 102-A and 102-C fully to the second communication protocol may cause the incompatible features A and C 108-A and 108-C to function improperly.

The network controller 104, in various examples, identifies the features utilized, included, or otherwise associated with the nodes A to C 102-A to 102-C. In some cases, the nodes A to C 102-A to 102-C self-report their associated features. For example, the nodes A to C 102-A to 102-C may transmit messages indicating their respective features to the network controller 104. In some examples, these messages are transmitted periodically (e.g., once a day, once a week, etc.). In some cases, the messages are transmitted in response to an event, such as each time a new feature is implemented on the reporting node (e.g., when a new hardware or software feature is installed), when the network controller transmits a request for the messages indicating features, or the like.

In various cases, the network controller 104 identifies which of the features are compatible features 106 and which of the features are incompatible features A and C 108-A and 108-C using a compatibility matrix 110. The compatibility matrix 110 stores data indicative of the compatibility of features with the second communication protocol. In some cases, the network controller 104 looks up the features reported by the nodes A to C 108-A to 108-C in the compatibility matrix 110 in order to identify the compatible features 106 and the incompatible features A to C 108-A and 108-C. For instance, the network controller 104 may identify an entry in the compatibility matrix 110 associated with the compatible feature 106, and the entry may store an indication that the compatible feature 106 is unaffected by a migration to the second communication protocol. In contrast, the network controller 105 may identify an entry in the compatibility matrix 110 associated with the incompatible feature A 108-A, and that entry may store an indication that the incompatible feature A 108-A will not function if node A 102-A is migrated to the second communication protocol.

In some cases, the compatibility matrix 110 may store data indicative of the compatibility of different versions of the features with the second communication protocol. For example, a feature that has been upgraded may be indicated separately in the compatibility matrix from a feature that has not been upgraded. For instance, the compatibility matrix 110 may include an entry associated with a first firmware version and another entry associated with a second firmware version. In some cases, the firmware versions may have different compatibilities with the second communication protocol.

In some examples, the compatibility matrix 110 is embodied in a datastore and/or computing device. Although FIG. 1 illustrates the compatibility matrix 110 as separate from the network controller 104, in some cases, the compatibility matrix 110 is stored by the network controller 104. Feature compatibilities with the second communication protocol may change over time. In addition, new features may be implemented within the network over time. Accordingly, in some cases, the network controller 104 may update the entries of the compatibility matrix 110. In some cases, the network controller 104 receives reports of the compatibility of various features with the second communication protocol. In various examples, the compatibility matrix 110 updates the entries of the compatibility matrix 110 based on changing compatibilities of various types of features that may be implemented in the network.

Once the network controller 104 differentiates the compatible features 106 from the incompatible features A and C 108-A and 108-C, the network controller 104 generates a list 112. The list 112 identifies which network features are incompatible with the migration to the second communication protocol. In some examples, the list 112 may indicate which features impact all of the nodes A to C 102-A to 102-C in the network and which features impact some of the nodes A to C 102-A to 102C in a network. According to some examples, the list 112 includes the incompatible features A and C 108-A and 108-C. However, in some cases, the list 112 may omit the compatible features 106, which may be unaffected by migration to the second communication protocol. In some examples, the list 112 omits identifiers of the nodes associated with the features. In some cases, multiple nodes may have the same feature, but the list 112 may include a single entry associated with that feature. Thus, the list 112 provides a simplified and easy-to-understand report of what features may be impacted by the migration to the second communication protocol.

The network controller 104 may output the list 112 to a user 114. In some cases, the network controller 104 may output the list 112 as a push notification, e-mail, text message, or the like, which can be output on a computing device associated with the user (e.g., a mobile phone, laptop, or the like). In some cases, the network controller 104 may output the list 112 to a user through an application, a wizard, or the like.

The user 114 sets limits on which of the nodes A to C 102-A to 102-C are going to be migrated, based on the unique requirements for the network. The user 114 may manually review the incompatible features A and C 108-A and 108-C in the list 112. In some cases, the user 114 is a network administrator or other person with substantial knowledge of the network. Based on the list 112, the user 114 may determine which of the incompatible features A and C 108-A and 108-C are important to the network. That is, the user 114 may determine which of the incompatible features A and C 108-A and 108-C are nonessential features 118 and which of the incompatible features A and C 108-A and 108-C are essential features 120.

Nonessential features 118 are incompatible features whose disfunction have limited impact on the network. Nonessential features 118 may include features that are not necessary for nodes or for a network to function properly. For example, node C 102-C may include nonessential features 118 that are not utilized in node C 102-C before migration to the second communication protocol. Examples of nonessential features 118 include features that are installed on node C 102-C but are no longer used by node C 102-C. Other examples of the nonessential features 118 are features that are being phased out of the network.

Essential features 120 are incompatible features whose disfunction will potentially cause significant impacts to the network. Essential features 120 may include features that are necessary for the nodes A to C 102-A to 102-C or for the network to function properly. For example, node 102-C may include essential features 120. Migration of node C 102-C to the second communication protocol, for example, could interrupt essential functions of the network.

The user 114 may provide a selection 116 to the network controller 104 based on the list 112. The selection 116 indicates which of the incompatible features A and C 108-A and 108-C can or cannot be excluded from nodes migrated to the second communication protocol. The selection 116 may indicate incompatible features associated with a subset of the nodes A to C 102-A to 102-C. As used herein, the term "subset," and its equivalents can refer to one or more entities. The user 114 may generate the selection 116 based on the unique requirements of the network. A device associated with the user 114 may transmit the selection 116 to the network controller 104 in response to a push notification, e-mail, text message or the like. For example, a user may send an e-mail or a text message. A user may transmit a selection to the network controller through an application, a wizard, or the like.

In some cases, the selection 116 may indicate which of the incompatible features A and C 108-A and 108-C in the list 112 are the nonessential features 118. In various cases, the selection 116 may indicate which of the incompatible features A and C 108-A and 108-C are the essential features 120. In some cases, the selection 116 indicates which of the incompatible features A and C 108-A and 108-C can be excluded from nodes migrated to the second communication protocol. For example, the user 114 may omit the essential features 120 of features A 108-A in the selection 116. The user 114 may include the nonessential features 118 of the incompatible features C 108-C in the selection 116.

In some cases, the network controller 104 may determine, based on the selection 116, which of the nodes 102 A to C 102-A to 102-C can or cannot be migrated to the second communication protocol. In various examples, the network controller 104 identifies which nodes in the network are associated with the essential features 120 that are incompatible with the second communication protocol. For example, the network controller 104 may determine that node A 102-A cannot be migrated to the second communication protocol because node A 102-A includes the essential features 120. In various cases, the network controller 104 may determine, based on the selection 116, which of the nodes A to C 102-A to 102-C can be migrated to the second communication protocol because they are not associated with any of the essential features 120. For example, the network controller 104 may determine that node B 102-B can be migrated because it is not associated with any of the incompatible features A and C 108-A and 108-C. Further, the network controller 104 may determine that node C 102-C can be migrated because, although it has incompatible features C 108-C, those incompatible features C 108-C include nonessential features 118 rather than essential features 120. Thus, even if the nonessential features 118 of node C 102-C fail to function after node C 102-C is migrated, there may be minimal disruptions on the network.

In some cases, the network controller 104 may be coordinating migration of more than one network, including the network including nodes A to C 102-A to 102-C, to the second communication protocol. The list 112 generated by the network controller 104 may organize incompatible features by each network. In this case, the user 114 may specify, in the selection 116, which networks are to be migrated to the second communication protocol. In the selection 116, the user 114 may indicate one or more incompatible, essential features (including the essential features 120) that will exclude hosting nodes from migration to the second communication protocol. Thus, in some examples, the network controller 104 may coordinate migration of nodes in multiple networks.

Once the network controller 104 has selected nodes (e.g., nodes B and C 102-B and 102-C) for migration, the network controller 104 may facilitate migration of the selected nodes to the second communication protocol. As used herein, the term "migration," and its equivalents, may refer to the process of configuring a network node to utilize a particular protocol. Thus, the network controller 104 may configure the selected nodes (e.g., nodes B and C 102-B and 102-C) to function properly with the second communication protocol. The network controller 104 may execute the migration. In some cases, the network controller 104 may notify the user 114 about which of the nodes A to C 102-A to 102-C will migrate to the second communication protocol.

In some cases, the migration can be scheduled by the user 114. In some cases, nodes may be migrated in a specific order. In some cases, the user 114 may determine the order of migration. For example, a subset of nodes in a network may be migrated before a second subset of nodes in the network. In some cases, node B 102-B may be migrated before node C 102-C because node B 102-B only includes compatible features. In another example, nodes in a first network and nodes in a second network may be migrated simultaneously before nodes in the network includes nodes A to C 102-A to 102-C. A migration may include generating a configuration for the selected nodes (e.g., nodes B and C 102-B and 102-C), such that the selected nodes and the network function properly after migrating to the second communication protocol.

The network controller 104 may generate configurations associated with the second communication protocol for the selected nodes B and C 102-B and 102-C. As used herein, the term "configuration," and its equivalents, may refer to data that enables a node to utilize a communication protocol. An example configuration may include an address (e.g., an address of the node being migrated), a routing table, a neighbor discovery protocol configuration, an maximum transmission unit (MTU) path discovery configuration, an Internet control message protocol (ICMP) configuration, or a ternary content-addressable memory (TCAM) space configuration. In some examples, a configuration may include a feature or a component of a feature.

According to some examples, the network controller 104 may at least partially migrate nodes (e.g., node A 102-A) with the essential features 120. For example, the network controller 104 may generate and distribute a dual-stack configuration that enables node A 102-A to utilize both the first communication protocol and the second communication protocol. A dual-stack configuration supports the first communication protocol and the second communication protocol. Thus, the dual-stack configuration may enable node A 102-A to utilize the second communication protocol for some features, but may enable the essential features 120 to be utilized with the first communication protocol. Dual-stack configurations may utilize a greater amount of processing resources at the applicable node than a full configuration associated with the second communication protocol. Thus, it may be beneficial to implement single-stack configurations for nodes B and C 102-B and 102-C, because they can be implemented without a significant impact on the network. However, in some cases, the network controller 104 may generate the dual-stack configuration for node A 102-A as an alternative to refraining from migrating node A 102-A to the second communication protocol entirely.

In some implementations, the network controller 104 causes node B and C 102-B and 102-C to be migrated to the second communication protocol. In some cases, after generating individual configurations for nodes B and C 102-B and 102-C, the network controller 104 will transmit migration messages to each of the nodes B and C 102-B and 102-C indicating that each of the nodes B and C 102-B and 102-C can be migrated to the second communication protocol. The migration message, for instance, includes the respective configurations for each of the nodes B and C 102-B and 102-C.

Optionally, if the essential features 120 are still utilized by node A 102-A, the network controller 104 may generate a dual-stack configuration for node A 102-A and send the configuration to node A 102-A. In some cases, the network controller 104 may determine that node A 102-A cannot be migrated and refrain from transmitting a migration message to node A 102-A.

In some cases, the network controller 104 will monitor the network after migration and determine whether the features 106, 108-A, and 108-C included in nodes A to C 102-A to 102-C are functioning properly. If the network controller 104 identifies that any of the features 106, 108-A, and 108-C are functioning improperly, the network controller 104 may notify the user 114. The user 114 can determine an appropriate action, such as rolling back any of the nodes to the first communication protocol or determining an alternate configuration of the nodes. The network controller 104 may notify the user 114 after one or more of the nodes A to C 102-A to 102-C are migrated successfully. After migration of node A 102-A is complete, for example, the network controller 104 may disable or remove the first communication protocol from node A 102-A.

In some cases, the essential feature 120 of node A 102-A is later removed from node A 102-A or updated to a version that is compatible with the second communication protocol. Node A 102-A, for instance, may be updated such that the essential features 120 are removed. Node A 102-A may send a message to the network controller 104 indicating the removal of the essential features 120. In response, the controller 104 may determine that node A 102-A no longer includes any essential features 120 that are incompatible with the second communication protocol. The network controller 104 may therefore initiate migration of node A 102-A from the first communication protocol to the second communication protocol. For instance, the network controller 104 may generate a configuration for node A 102-A and send a migration message to node A 102-A that includes the generated configuration. In some cases, the network controller 104 may determine that the essential feature 120 has a version that is compatible with the second communication protocol. The network controller 104 may notify the user 114 of the compatible version. In some cases, the network controller 104 may update the essential feature 120 to the compatible version. In some cases, the network controller 104 may refrain from migrating node A 102-A until a compatible version of the essential feature 120 is identified and installed.

In various implementations, the network controller 104 may perform additional functions to facilitate migration of the network to the second communication protocol. For example, the network controller 104 may track the list of essential features 120, as indicated in the selection 116. The network controller 104 may determine second communication protocol-compatible alternatives to the essential features 120, such as version updates that can be utilized with the second communication protocol. In some cases, the network controller 104 reports these alternatives to the user 114. The user 114, for instance, can take steps to implement the second communication protocol-compatible alternatives in the network, as a way to promote migration of the entire network to the second communication protocol. In turn, the network controller 104 can migrate nodes (e.g., node A 102-A) whose features are transformed into exclusively features compatible with the second communication protocol.

Figure 2:
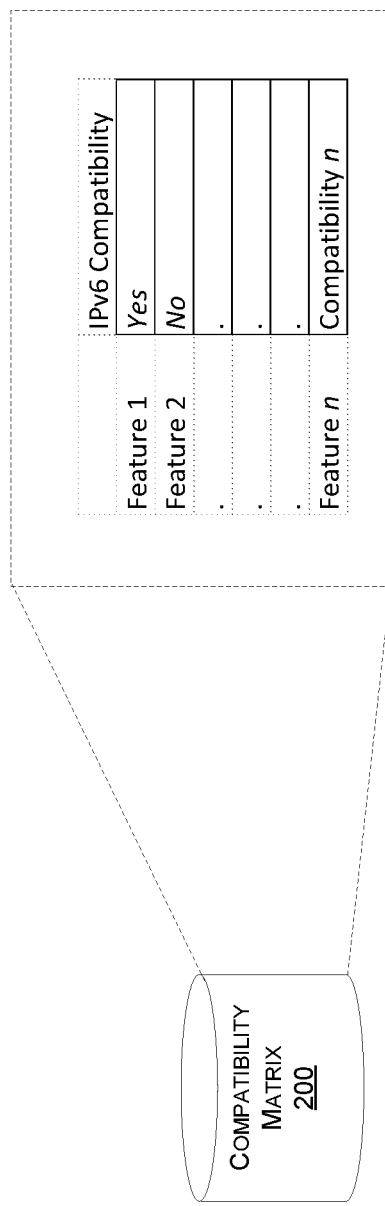
FIG. 2 illustrates an example compatibility matrix for identifying features in a network that are compatible or incompatible with a communication protocol.

FIG. 2 illustrates an example compatibility matrix 200 for identifying features in a network that are compatible or incompatible with a communication protocol. The compatibility matrix 200, for example, is the compatibility matrix 110 described above with reference to FIG. 1.

The compatibility matrix 200, in various implementations, is or is included in a datastore (e.g., a database). The compatibility matrix 200 may include multiple entries. Each entry may be associated with a feature that can be implemented in a node (e.g., one of the nodes A to C 102-A to 102-C) in a network. For example, each entry is associated with a hardware feature or a software feature utilized by one or more nodes in an SDWAN network. In some cases, a single feature appears with different versions. Each version, for example, may be assigned its own entry within the compatibility matrix 200. As shown in FIG. 2, the entries of the compatibility matrix 200 are stacked vertically. The entries of the compatibility matrix 200, for example, are indexed by feature type or feature version. The compatibility matrix 200 of FIG. 2 includes n entries corresponding to n features, wherein n is an integer that is greater than one.

The compatibility matrix 200 indicates whether each feature is compatible with IPv6 (or some other communication protocol). In some cases, each entry includes a Boolean value (e.g., yes or no, 1 or 0, etc.) that is indicative of the IPv6 compatibility of the respective feature. For example, Feature 1 is indicated as being compatible with IPv6 (a "compatible" feature), whereas Feature 2 is indicated as being incompatible with IPv6 (an "incompatible" feature). For instance, if a node including Feature 2 is migrated to IPv6, Feature 2 may cease to operate on the node.

In alternative implementations, the compatibility matrix 200 lists incompatible features. If a feature becomes compatible with IPv6, then the entry associated with that feature may be removed from the compatibility matrix 200. In some cases, the compatibility matrix 200 lists only compatible features. If a feature becomes compatible with IPv6, then an entry associated with that feature may be added to the compatibility matrix 200. In various cases, a network controller (e.g., an SDWAN controller) utilizes the compatibility matrix 200 to predict whether any nodes in a network include features that are resistant (e.g., will disfunction, cease to function, etc.) when they are migrated to IPv6.

Figure 3:
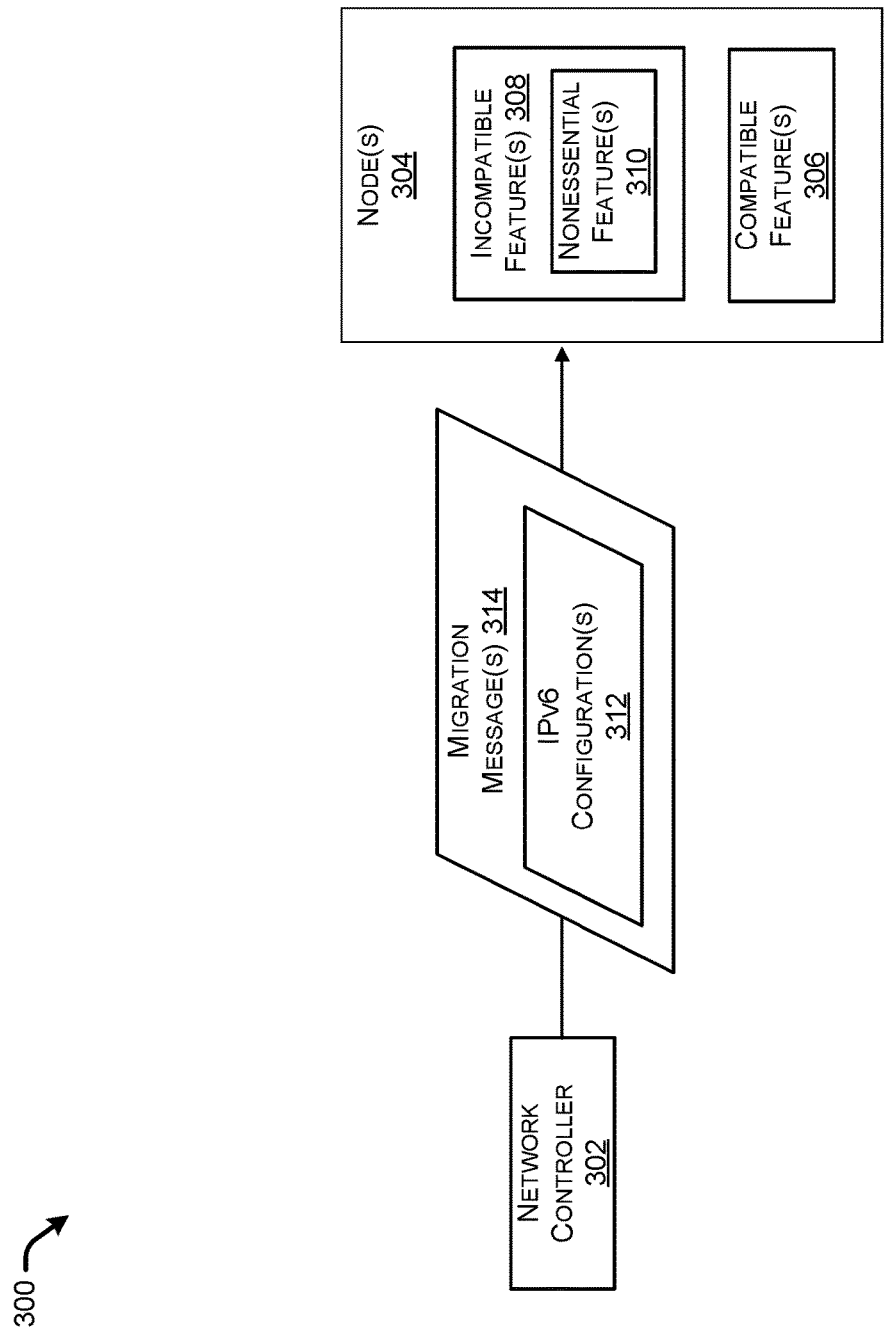
FIG. 3 illustrates example signaling for migrating a node to IPv6.

FIG. 3 illustrates example signaling 300 for migrating a node to IPv6. The signaling 300 is between a network controller 302 (e.g., the network controller 104 described above with reference to FIG. 1) and one or more nodes 304 (e.g., one or more of nodes A to C 102-A to 102-C described above with reference to FIG. 1).

In various implementations, the network controller 302 preselects the node(s) 304 for migration based on features associated with the node(s) 304. For example, the network controller 302 may determine that the node(s) 304 include one or more compatible features 306. The compatible feature(s) 306 include features that will continue to function after their hosting node(s) 304 are migrated to IPv6.

The network controller 302 may also determine that the node(s) 304 include one or more incompatible features 308. The incompatible feature(s) 308 are features that will not function, or will function improperly or unpredictably, when the hosting node(s) 304 are migrated to IPv6. However, the network controller 302 may nevertheless determine to migrate the node(s) 304 with the incompatible feature(s) 308 because the incompatible feature(s) 308 include and/or are one or more nonessential feature(s) 310. The nonessential feature(s) 310 include features whose disfunction is superfluous or otherwise important to ongoing network operations. However, the node(s) 304 may omit any essential features that are incompatible with IPv6 migration.

Once the node(s) 304 are identified, the network controller 302 may generate one or more IPv6 configurations 312 respectively for the node(s) 304. The IPv6 configuration(s) 312, for example, include data that enables the node(s) 304 to utilize IPv6 within the network. In various cases, the network controller 302 transmits one or more migration messages 314 to the node(s) 304. The migration message(s) 314 may cause the node(s) 304 to transition from IPv4 to IPv6. For instance, the migration message(s) 314 include the IPv6 configuration(s) 312.

Figure 4:
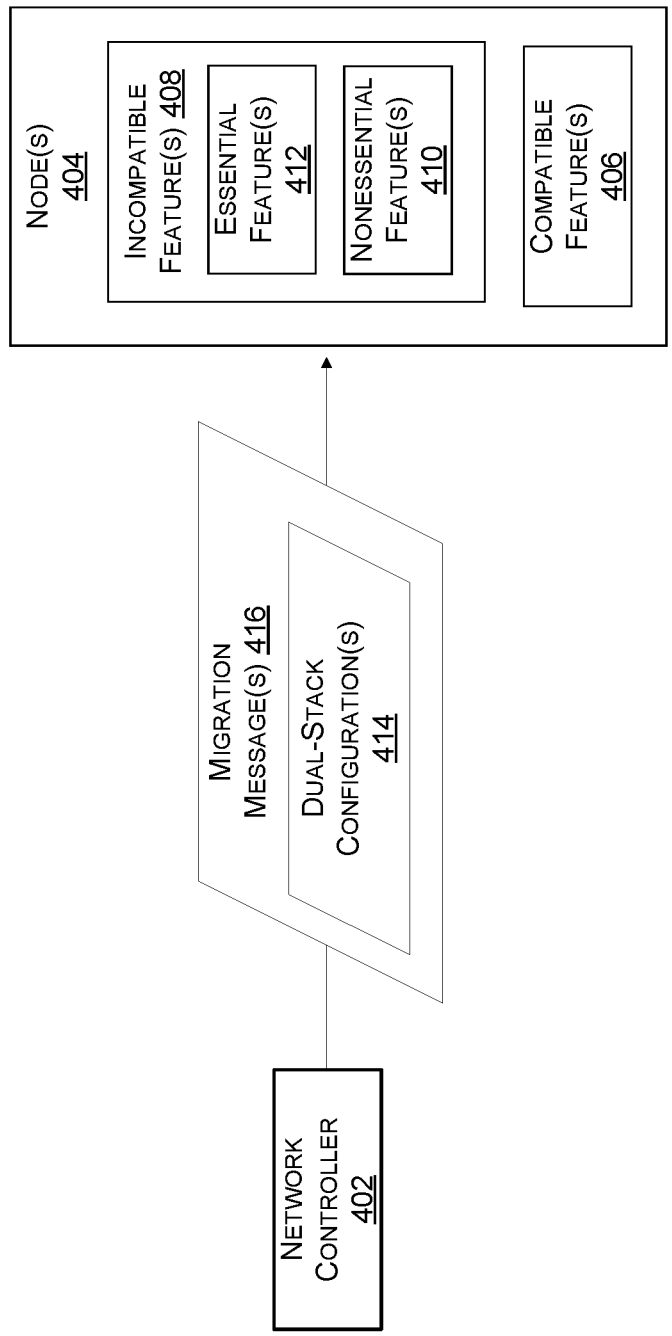
FIG. 4 illustrates example signaling for migrating a node to IPv6, while retaining some IPv4 functionality.

FIG. 4 illustrates example signaling 400 for migrating a node to IPv6, while retaining some IPv4 functionality. The signaling 400 is between a network controller 402 (e.g., the network controller 104 described above with reference to FIG. 1) and one or more nodes 404 (e.g., one or more of nodes A to C 102-A to 102-C described above with reference to FIG. 1).

In various implementations, the network controller 402 preselects the node(s) 404 for migration based on features associated with the node(s) 404. For example, the network controller 402 may determine that the node(s) 404 include one or more compatible features 406. The compatible feature(s) 406 include features that will continue to function after their hosting node(s) 404 are migrated to IPv6.

The network controller 402 may also determine that the node(s) 404 include one or more incompatible features 408. The incompatible feature(s) 408 are features that will not function, or will function improperly or unpredictably, when the hosting node(s) 404 are migrated to IPv6. The incompatible feature(s) 408 because the incompatible feature(s) 408 include and/or are one or more nonessential feature(s) 410. The nonessential feature(s) 410 include features whose disfunction is superfluous or otherwise unimportant to ongoing network operations. In addition, the node(s) 404 may include one or more essential features 412. The essential feature(s) 412 include features whose disfunction can have a significant impact to ongoing network operations.

Due to the essential feature(s) 412 in the node(s) 404, the node(s) 404 cannot be fully migrated to IPv6. Accordingly, the network controller 402 may generate one or more dual-stack configurations 414 respectively for the node(s) 404. The dual-stack configuration(s) 414, for example, include data that enables the node(s) 404 to utilize IPv4 and IPv6 within the network. In various cases, the network controller 402 transmits one or more migration messages 416 to the node(s) 404. The migration message(s) 416 may cause the node(s) 404 to transition from IPv4 to utilizing both IPv4 and IPv6. In some cases, the dual-stack configuration(s) 414 may cause the node(s) 404 to utilize IPv6 for the compatible feature(s) 406 and the nonessential feature(s) 410, but may cause the node(s) 404 to utilize IPv4 for the essential feature(s) 412. For instance, the migration message(s) 416 include the dual-stack configuration(s) 414.

Figure 5:
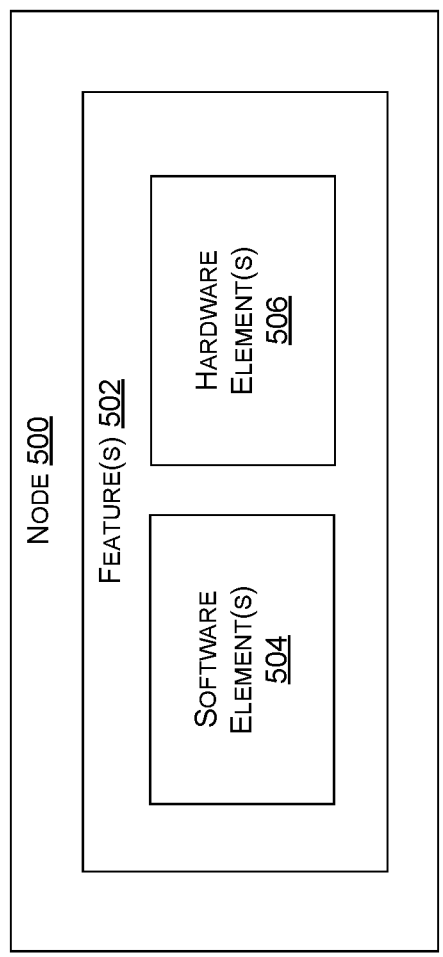
FIG. 5 illustrates an example node to be migrated to IPv6.

FIG. 5 illustrates an example node 500 to be migrated to IPv6. The node 500 includes various features 502. The features 502 include one or more software elements 504 and/or more hardware elements 506. Examples of the software element(s) 504 include a kernel, an operating system, application, firmware, or a program. Examples of the hardware element(s) 506 include a processor, a memory device, an input device, an output device, a network interface card, a wireless network interface controller, or a wireless network adapter. In various implementations, one or more of the features 502 are incompatible with IPv6 migration. The node 500 may report its features 502 to a controller, which may control whether to migrate the node 500 to IPv6 in view of its features 502.

Figure 6:
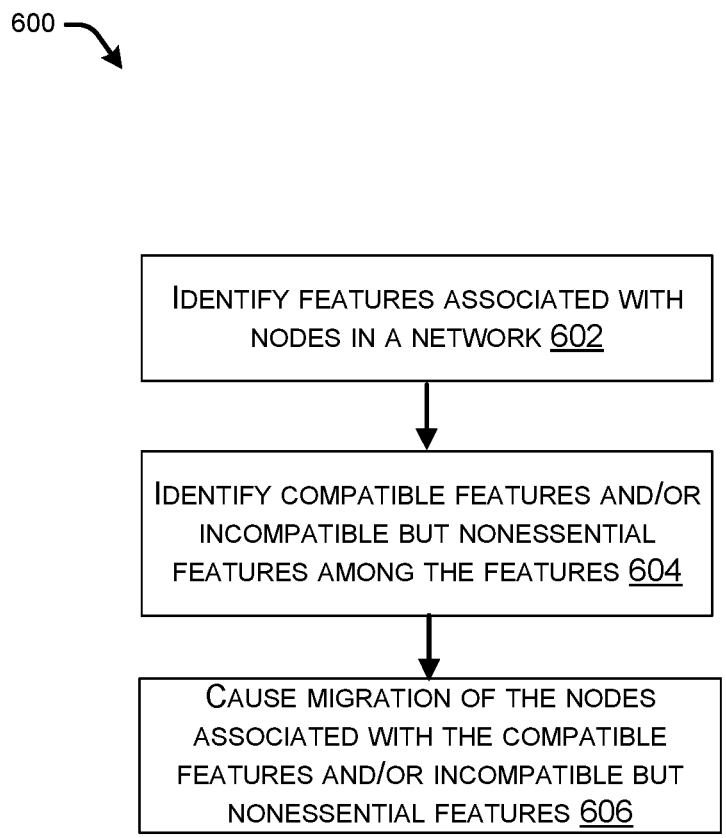
FIG. 6 illustrates an example process for migrating nodes to a communication protocol.

FIG. 6 illustrates an example process 600 for migrating nodes to a communication protocol. The process 600 is performed by an entity, which may include a processor, a computing device, a network controller (e.g., an SDWAN controller, the network controller 104, etc.), or any combination thereof.

In some cases, the entity identifies nodes in a network. For example, the entity discovers the nodes using a discovery protocol. In some cases, the network architecture is predetermined by the entity, so the entity is aware of the presence and placement of each of the nodes in the network.

At 602, the entity identifies features associated with the nodes in a network. For instance, the features may include software elements and/or hardware elements installed on the nodes. Examples of software elements include a kernel, an operating system, application, firmware, or a program. Examples of hardware elements include a network interface card, a wireless network interface controller, a wireless network adapter, a microprocessor, a memory device, a chipset, or an input/output device.

At 604, the entity identifies compatible features and/or incompatible but nonessential features among the features. In various cases, the compatible features are compatible with a communication protocol (e.g., IPv6) and incompatible features are incompatible with the communication protocol. In some implementations, the entity determines which features are compatible and which are incompatible using a compatibility matrix (also referred to as an "IPv6-feature compatibility matrix" if the communication protocol is IPv6). For example, the entity compares the features of the nodes to entries in the compatibility matrix in order to determine which of the features are incompatible with the communication protocol.

The nonessential features, for example, are incompatible features whose disfunction may minimally impact the network. The entity may identify which of the incompatible features are essential and which are nonessential based on user input. For instance, the entity may output, to a user, a list of the incompatible features. Further, the entity may receive, from the user, a selection indicating the nonessential features among the incompatible features.

At 606, the entity causes migration of the nodes associated with the compatible features and/or the incompatible but nonessential features. For example, the entity may identify at least one of the nodes corresponding to the selection from the user. That is, the entity may identify one or more of the nodes that are not associated with any of the incompatible and essential features. The identified node(s), however, may be associated with compatible features and/or incompatible but nonessential features. The entity may cause migration of the identified nodes to the communication protocol. For example, the entity may generate a configuration for each of the identified node(s) that enables the node(s) to utilize the communication protocol. An individual configuration, for instance, includes an address, a routing table, a neighbor discovery protocol configuration, a maximum transmission unit (MTU) path discovery configuration, an Internet control message protocol (ICMP) configuration, or a ternary content-addressable memory (TCAM) space configuration. The entity may transmit, to the identified node(s), a migration message that triggers migration of the node(s) to the communication protocol. For example, each migration message may respectively include the applicable configuration for the receiving node.

In various implementations, the entity receives a selection from the user that indicates one or more essential features. The entity may identify one or more of the nodes that include or otherwise utilize the essential feature(s). In various implementations, the entity may refrain from causing the node(s) utilizing the essential feature(s) to migrate to the communication protocol. Alternatively, the entity may generate and distribute a dual-stack configuration for the node(s) utilizing the essential feature(s), so that the node(s) can partially utilize the communication protocol without interrupting the functions of the essential feature(s).

Figure 7:
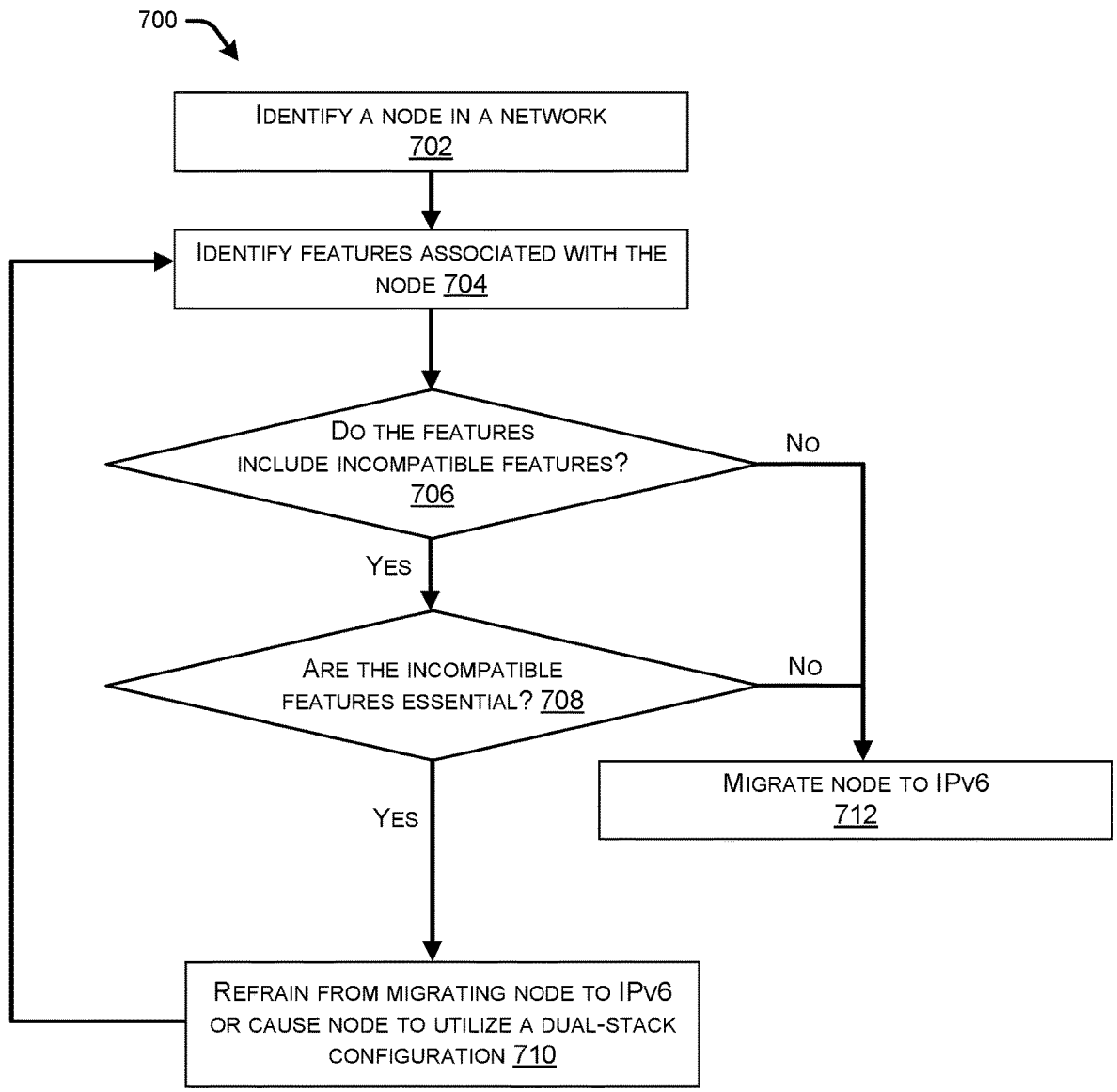
FIG. 7 illustrates an example process for migrating a single node to IPv6.

FIG. 7 illustrates an example process 700 for migrating a single node to IPv6. The process 700 is performed by an entity, which may include a processor, a computing device, a network controller (e.g., the network controller 104), or any combination thereof.

At 702, the entity identifies a node in a network. For example, the entity discovers the node using a discovery protocol. In some cases, the network architecture is predetermined by the entity, so the entity is aware of the presence and placement of the node in the network.

At 704, the entity identifies features associated with the node. For instance, the features may include software elements and/or hardware elements installed on the nodes. Examples of software elements include a kernel, an operating system, application, firmware, or a program. Examples of hardware elements include a network interface card, a wireless network interface controller, a wireless network adapter, a microprocessor, a memory device, a chipset, or an input/output device.

At 706, the entity determines whether the features include incompatible features. The incompatible features are incompatible with IPv6. In some implementations, the entity compares the features of the node to entries in an IPv6-feature compatibility matrix in order to determine which of the features are incompatible with IPv6.

If the entity determines that the features include incompatible features at 706, then the process 700 proceeds to 708. At 708, the entity determines whether the incompatible features are essential. The essential features, for example, are incompatible features whose disfunction may significantly disrupt the network. The entity may identify which of the incompatible features are essential and which are nonessential based on user input. For instance, the entity may output, to a user, a list of the incompatible features. Further, the entity may receive, from the user, a selection indicating the nonessential features among the incompatible features.

If the entity determines that the incompatible features include essential features at 708, then the process 700 proceeds to 710. At 710, the entity refrains from migrating the node to IPv6 or causes the node to utilize a dual-stack configuration. A dual-stack configuration enables the node to partially use IPv6 without interrupting the functions of the essential features.

If, on the other hand, the entity determines that the features do not include incompatible features at 708, or the entity determines that the incompatible features are not essential at 710, then the process 700 proceeds to 712. At 712, the entity migrates the node to IPv6. For example, the entity may generate an IPv6 configuration for the node that enables the node to utilize IPv6. An IPv6 configuration, for instance, includes an IPv6 address, an IPv6 routing table, an IPv6 neighbor discovery protocol configuration, an IPv6 maximum transmission unit (MTU) path discovery configuration, an IPv6 Internet control message protocol (ICMPv6) configuration, or a ternary content-addressable memory (TCAM) space configuration. The entity may transmit, to the node, a migration message that triggers migration of the node to IPv6. For example, the migration message may include the IPv6 configuration for the node.

Figure 8:
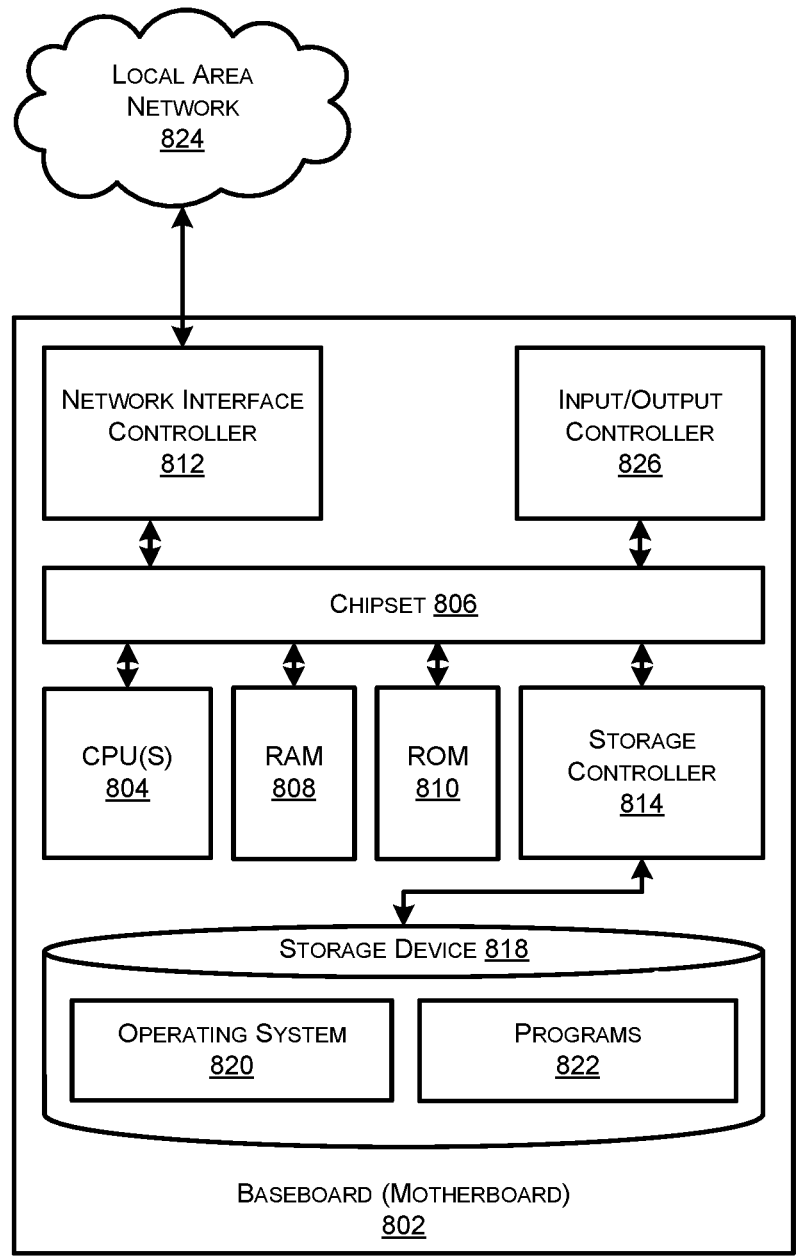
FIG. 8 shows an example computer architecture for a computer capable of executing program components for implementing the functionality described herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a network node or controller (e.g., the network controller 104) described herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a random-access memory (RAM) 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 824. The chipset 806 can include functionality for providing network connectivity through a network interface controller (NIC) 812, such as a gigabit Ethernet adapter. The NIC 812 is capable of connecting the computer 800 to other computing devices over the network 824. It should be appreciated that multiple NICs 812 can be present in the computer 800, connecting the computer 800 to other types of networks and remote computer systems. In some instances, the NICs 812 may include at least on ingress port and/or at least one egress port.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by any network node described herein may be supported by one or more devices similar to computer 800. Stated otherwise, some or all of the operations performed by a network node may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system 820 comprises the LINUX™ operating system. According to another embodiment, the operating system 820 includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 818 can store other system or application programs and data utilized by the computer 800.

In one embodiment, the storage device 818 or other computer-readable storage media includes one or more programs 822. The programs 822, for example, include computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein. The program(s) 822, for example, include one or more processes. The process(es) may include instructions that, when executed by the CPU(s) 804, cause the computer 800 and/or the CPU(s) 804 to perform one or more operations.

The computer 800 can also include one or more input/output controllers 826 for receiving and processing input from a number of input devices, such as a keyboard, a mouse, a touchpad, a touch screen, an electronic stylus, or other type of input device. Similarly, an input/output controller 826 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a software-defined wide area network (SDWAN) controller, the method comprising:
   identifying nodes in a network;
   identifying features associated with the nodes;
   identifying IPv6-incompatible features among the features;
   outputting, to a user, a list of the IPV6-incompatible features;
   receiving, from the user, a selection of nonessential features comprising at least one of the IPv6-incompatible features;
   identifying a first subset of the nodes corresponding to the selection;
   causing migration of the first subset of the nodes to IPV6;
   determining, based on the selection, an essential feature among the IPV6-incompatible features;
   identifying an IPv6-compatible version of the essential feature;
   outputting a first alert indicating the IPV6-compatible version of the essential feature;
   receiving, from a second subset of the nodes corresponding to the essential feature, a second alert indicating a IPv6-compatible update of the essential feature; and
   causing the migration of the second subset of the nodes to IPv6.

2. The method of claim 1, wherein the features further comprise IPv6-compatible features.

3. The method of claim 1, wherein the features comprise software elements or hardware elements installed in the nodes.

4. The method of claim 3, wherein the software elements comprise at least one of: a kernel, an operating system, application, firmware, or a program, and
   wherein the hardware elements comprise at least one of: a network interface card, a wireless network interface controller, a wireless network adapter, a microprocessor, a memory device, a chipset, or an input/output device.

5. The method of claim 1, wherein identifying the IPV6-incompatible features among the features comprises:
   determining, based on an IPV6-feature compatibility matrix, the IPv6-incompatible features.

6. The method of claim 1, wherein causing the migration of the first subset of the nodes to IPv6 comprises:
   identifying an IPV6 configuration of the first subset of the nodes; and
   transmitting, to the first subset of the nodes, a migration message indicating the IPv6 configuration.

7. The method of claim 1, the selection being a first selection, the method further comprising:
   receiving, from the user, a second selection of essential features among the IPv6-incompatible features;
   identifying a third subset of the nodes corresponding to the second selection of essential features; and
   refraining from migrating the third subset of the nodes to IPv6.

8. The method of claim 1, wherein the essential feature is a first essential feature, the method further comprising:
receiving, from the first subset of the nodes, an indication that a second essential feature is functioning properly in response to the migration to IPv6; and
storing the indication in an IPV6-feature compatibility matrix.

9. An SDWAN controller, comprising:
at least one processor; and
memory storing instructions that, when executed by the at least one processor, cause the SDWAN controller to perform operations comprising:
identifying nodes in a network;
identifying features associated with the nodes;
identifying incompatible features among the features, the incompatible features being unsupported by a communication protocol;
outputting a list of the incompatible features;
receiving a selection of nonessential features comprising at least one of the incompatible features;
identifying a first subset of the nodes corresponding to the selection;
causing migration of the first subset of the nodes to the communication protocol;
determining, based on the selection, an essential feature among the incompatible features;
identifying a compatible version of the essential feature;
outputting a first alert indicating the compatible version of the essential feature;
receiving, from a second subset of the nodes corresponding to the essential feature, a second alert indicating a compatible update of the essential feature; and
causing the migration of the second subset of the nodes to the communication protocol.

10. The SDWAN controller of claim 9, wherein the essential feature is a first essential feature, the operations further comprising:
identifying, based on the selection, second essential features among the incompatible features;
identifying a third subset of the nodes corresponding to the second essential features; and
refraining from migrating the third subset of the nodes to the communication protocol.

11. The SDWAN controller of claim 9, the operations further comprising:
identifying a list of compatible features associated with the nodes, the compatible features supported by the communication protocol; and
determining, based on a feature compatibility matrix, a list of incompatible features.

12. The SDWAN controller of claim 9, wherein the features comprise software elements or hardware elements installed in the nodes, the software elements comprising at least one of: a kernel, an operating system, application, firmware, or a program, and the hardware elements comprising at least one of: a network interface card, a wireless network interface controller, a wireless network adapter, a microprocessor, a memory device, a chipset, or an input/output device.

13. The SDWAN controller of claim 9, wherein causing the migration of the first subset of the nodes to the communication protocol comprises:
identifying a configuration of the first subset of the nodes, the configuration being compatible with the communication protocol; and
transmitting, to the first subset of the nodes, a migration message indicating the configuration.

14. An SDWAN controller, comprising:
at least one processor; and
memory storing instructions that, when executed by the at least one processor, cause the SDWAN controller to perform operations comprising:
identifying edge devices in a network, the edge devices utilizing IPv4;
identifying features associated with the edge devices;
identifying IPv6-incompatible features among the features;
outputting a list of the IPV6-incompatible features;
receiving a selection of nonessential features comprising at least one of the IPv6-incompatible features;
identifying a first subset of the edge devices corresponding to the selection;
causing migration of the first subset of the edge devices from IPv4 to IPv6;
determining, based on the selection, an essential feature among the IPv6-incompatible features;
identifying a compatible version of the essential feature;
outputting a first alert indicating the compatible version of the essential feature;
receiving, from a second subset of the edge devices corresponding to the essential feature, a second alert indicating an IPv6-compatible update of the essential feature; and
causing the migration of the second subset of the edge devices to IPV6.

15. The SDWAN controller of claim 14, the operations further comprising:
identifying an IPv6 configuration for the first subset of the edge devices, the IPV6 configuration excluding the nonessential features.

16. The SDWAN controller of claim 14, the operations further comprising:
identifying essential features among the IPv6-incompatible features;
identifying an IPv6-compatible configuration of the essential features; and
causing an update of the essential features to the IPV6-compatible configuration.

17. The SDWAN controller of claim 14, the operations further comprising:
identifying a successful migration of the first subset of the edge devices to IPV6; and
disabling IPv4 on the first subset of the edge devices.

18. The SDWAN controller of claim 14, the selection being a first selection; the operations further comprising:
receiving a second selection of nonessential features comprising at least one of the IPv6-incompatible features;
identifying a third subset of the edge devices corresponding to the second selection; and
causing migration of the third subset of the edge devices corresponding to the second selection from IPv4 to IPV6.

19. The SDWAN controller of claim 14, wherein the list comprises an indication of a subset of the IPV6-incompatible features associated with the edge devices in the network.

20. The SDWAN controller of claim 14, wherein the essential feature is a first essential feature, the operations further comprising:

receiving, from the first subset of the edge devices, an indication that a second essential feature is malfunctioning in response to the migration to IPv6;

identifying a third subset of the edge devices corresponding to the second essential feature; and causing migration of a fourth subset of the edge devices to IPv6 without migrating the third subset of the edge devices to IPV6.

* * * * *